(12) United States Patent
Nakamura et al.

(10) Patent No.: US 7,719,656 B2
(45) Date of Patent: *May 18, 2010

(54) LIQUID CRYSTAL DISPLAY DEVICE

(75) Inventors: Masako Nakamura, Nara (JP); Yoshito Hashimoto, Mie (JP); Tokihiko Shinomiya, Nara (JP); Shigeaki Mizushima, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 867 days.

This patent is subject to a terminal disclaimer.

(21) Appl. No.: 11/354,238

(22) Filed: Feb. 15, 2006

(65) Prior Publication Data

US 2006/0244873 A1   Nov. 2, 2006

Related U.S. Application Data

(63) Continuation-in-part of application No. 10/929,725, filed on Aug. 31, 2004, now Pat. No. 7,463,328.

(30) Foreign Application Priority Data

| Sep. 24, 2003 | (JP) | ............................. 2003-330905 |
| Apr. 12, 2004 | (JP) | ............................. 2004-117102 |
| Aug. 23, 2004 | (JP) | ............................. 2004-242338 |
| Mar. 23, 2005 | (JP) | ............................. 2005-085018 |

(51) Int. Cl.
   *C09K 19/02* (2006.01)
(52) U.S. Cl. .................................................. 349/167
(58) Field of Classification Search ........................ None
   See application file for complete search history.

(56) References Cited

U.S. PATENT DOCUMENTS 4,305,807 A * 12/1981 Somlyody ................... 349/166
5,303,073 A *  4/1994 Shirota et al. ................. 349/74
5,307,187 A *  4/1994 Sunohara et al. ............. 349/89
5,650,872 A *  7/1997 Saxe et al. ................... 359/296
5,760,860 A *  6/1998 Mason et al. ................. 349/86

(Continued)

FOREIGN PATENT DOCUMENTS

| JP | 63 96629 | 4/1988 |
| JP | 05-107524 | 4/1993 |
| JP | 5-216074 A | 8/1993 |
| JP | 11-183937 A | 7/1999 |
| JP | 11-249112 A | 9/1999 |
| JP | 11-287980 A | 10/1999 |
| JP | 2001-337351 A | 12/2001 |
| JP | 2003-140107 A | 5/2003 |

OTHER PUBLICATIONS

Yamamoto et al, "Dynamics of Liquid Crystal Microemulsion", Lecture Notes for the 1999 Seminar of Japanese Liquid Crystal Society w/ partial English translation, Sep. 29-Oct. 1, 1999, pp. 318-319.

(Continued)

*Primary Examiner*—Timothy Rude
(74) *Attorney, Agent, or Firm*—Nixon & Vanderhye P.C.

(57) ABSTRACT

It is an object of the present invention to provide a liquid crystal display device in which a liquid crystal layer may form a stable transparent state and, in addition, which provides for a black display with an excellent viewing angle characteristic, as well as a high contrast ratio and a high response speed in liquid crystal display. The present invention is directed to a liquid crystal display device comprising an electrode and a liquid crystal layer between substrates, said liquid crystal layer consists of a liquid crystalline material containing liquid crystal molecules and fine particles, and is optically isotropic when the voltage applied to the electrode is lower than a threshold value and undergoes optical transition due to change in the arrangement of the liquid crystal molecules when the applied voltage is not lower than the threshold value.

20 Claims, 4 Drawing Sheets

U.S. PATENT DOCUMENTS

| | | | | |
|---|---|---|---|---|
| 5,784,136 | A | * | 7/1998 | Ando et al. ................... 349/86 |
| 5,961,804 | A | * | 10/1999 | Jacobson et al. ............ 204/606 |
| 6,266,109 | B1 | * | 7/2001 | Yamaguchi et al. ........... 349/86 |
| 6,266,121 | B1 | * | 7/2001 | Shigeta et al. .............. 349/156 |
| 6,678,027 | B2 | * | 1/2004 | Park et al. ................... 349/141 |
| 6,714,305 | B2 | | 3/2004 | Hoke |
| 7,463,328 | B2 | | 12/2008 | Nakamura et al. |

OTHER PUBLICATIONS

Jyunichiro et al, "Introduction to Particle/Powder Technology", and partial English translation, Nikkan Kogyo Shinbun Ltd., Sep. 25, 2002, pp. 104-105.

* cited by examiner

LIQUID CRYSTAL DISPLAY DEVICE

REFERENCE TO RELATED APPLICATION

This is a continuation-in-part of application Ser. No. 10/929,725 filed on Aug. 31, 2004 now U.S. Pat. No. 7,463,328.

This Nonprovisional application claims priority under 35 U.S.C §119(a) on Patent Application No.2003-330905 filed in Japan on Sep. 24, 2003, No.2004-117102 filed in Japan on Apr. 12, 2004, No.2004-242338 filed in Japan on Aug. 23, 2004 and No.2005-085018 filed in Japan on Mar. 23, 2005, the entire contents of which are hereby incorporated by reference.

FIELD OF THE INVENTION

The present invention relates to a liquid crystal display device. More particularly, the invention relates to a liquid crystal display device comprising an electrode and a liquid crystal layer both being formed between a pair of spaced-apart substrates which are placed oppositely each other.

DESCRIPTION OF THE RELATED ART

The liquid crystal display device is a display means utilizing characteristics of liquid crystal molecules, and is in broad use for displaying information and images. The liquid crystal display device of the type which is most prevalently in use at the present time is TN-LCD (twisted nematic liquid crystal display). Above all else, the fabrication technology for TN-TFT (thin film transistor)-LCD has made a dramatic progress in recent years, even to the extent that the device today is surpassing the CRT (cathode-ray tube) in front contrast ratio and color reproducibility. In regard to liquid crystal display devices such as TN-LCD, there is a demand for improving the narrow viewing angle of displays, which limits the scope of application of the devices, to thereby broaden their applicability taking various advantages of liquid crystal displays.

For the purpose of improving such characteristics of liquid crystal displays, an LCD of the type called IPS (in-plane switching) has been proposed but when the IPS system is adopted, the response speed decreases because liquid crystal molecules are moved in a lateral direction by an electric field. Moreover, for improving the viewing angle characteristic of the TN type, a VA (vertical alignment) system has been proposed. However, when the VA system is used, a black display appears whitish when the viewing angle is shifted from the front, for example, so that the contrast ratio is sacrificed although not so much as in the case of the TN type.

Regarding new modes of liquid crystals, a phase diagram of a liquid crystal microemulsion has been disclosed for a system comprising a mixture of lyotropic liquid crystals and thermotropic liquid crystals (for example, refer to Yamamoto, Jun and one other: "Dynamics of Liquid Crystal Microemulsions", Lecture Notes for the 1999 Seminar of Japanese Liquid Crystal Society, Japanese Liquid Crystal Society, Sep. 29 to Oct. 1, 1999, pages 318 to 319). In this publication, it is described that in a system comprising a mixture of a reversed micelle phase of a DDAB aqueous solution and a nematic phase of a 5CB, notwithstanding the local formation of nematic orientational orders within a certain concentration-temperature range, macroscopically, an isotropic phase was formed and this has been named a transparent nematic phase. It is reported that in this transparent nematic phase, liquid crystal molecules are forced into vertical alignment on the surface of the reversed micelle of the emulsion (a), and because the distance between the micelles is sufficiently shorter than the visible light wavelength, the system shows macroscopically isotropic. The phase diagram of a liquid crystal microemulsion is shown in FIG. 6. In the diagram, (A), (B), and (C) are schematic views resulting from changes in temperature and concentration; (A) represents an isotropic state, (B) represents a transparent nematic phase, and (C) represents a state (c) in which nematic orientational orders have been locally formed.

However, although it is stated that, in such a liquid crystal microemulsion, the liquid crystals undergo phase transition in response to changes in temperature and concentration to form a transparent nematic phase, there is no disclosure of an art to optically modulate the transparent nematic phase. Furthermore, in the formation of said emulsion (a), it is difficult to attain a microfine size and, moreover, many hours of standing results in separation of the transparent nematic phase and ceasing to maintain an emulsion state, so that there was room for further technical innovation.

Meanwhile, regarding a liquid crystal layer containing a dispersion of particles, there has been disclosed a liquid crystal display device comprising a liquid crystal element prepared by dissolving or dispersing a dichroic colorant and nanoparticles in a nematic liquid crystal and aligning liquid crystal molecules in a liquid crystal cell in a direction vertical to the substrates, with the provision for application of a voltage in the direction vertical to the substrates [for example, refer to Japanese Kokai Publication No. 2001-337351 (pages 1 to 3)]. In this liquid crystal display device, liquid crystal molecules are aligned in the direction vertical to the substrates to become transparent when no voltage is applied, and under voltage application, nanoparticles prevent alignment of dichroic colorant molecules etc. and the randomly aligned dichroic colorant molecules absorb light to cause change in light transmittance. It is to be understood that since the transparent state in this liquid crystal display device is the state in which liquid crystals are aligned in the direction vertical to the substrates, it is a state in which a general nematic phase is formed and not a state in which local nematic phases are formed.

Furthermore, there has been disclosed a liquid crystal optical element comprising a dispersion of inorganic oxide fine particles having a refractive index equivalent to the refractive index of a liquid crystalline material either under application of a voltage or under no voltage application in a matrix of the liquid crystalline material [for example, refer to Japanese Kokai Publication Hei-11-287980 (pages 1 to 3)]. This liquid crystal optical element is designed to change in light transmittance by utilizing the refractive indexes of liquid crystalline material and inorganic oxide fine particles.

However, these are not devices utilizing the characteristic of a transparent nematic phase that despite the nematic orientational orders are locally formed, an isotropic phase is macroscopically formed. Thus, there was room for a technical breakthrough to make a liquid crystal display device improved in fundamental performance by using the above characteristic of the transparent nematic phase.

Referring to a fine liquid crystal dispersion, an electrooptic material comprising a dispersion of liquid crystal droplets having particle diameters of smaller than 100 nm in a polyimide has been disclosed [for example, refer to Japanese Kokai Publication Hei-11-249112 (pages 1 to 3)].

This electro-optical material is produced by dispersing fine metal particles or $SiO_2$ fine particles in a polyimide precursor, molding the dispersion into a film, and subjecting the film to a heating step and further to a step of dissolving the fine metal particles or $SiO_2$ fine particles with a strong acid. However, said characteristic of a transparent nematic phase is not used even in such a fine liquid crystal dispersion.

Therefore, there has been a demand for a liquid crystal display of a novel mode which has the characteristic of a transparent nematic phase and, at the same time, is capable of exhibiting this characteristic in a stable manner to thereby exhibit various performance characteristics necessary for liquid crystal displays sufficiently.

SUMMARY OF THE INVENTION

The present invention has been made in view of the above state of the art, and has for its object to provide a liquid crystal display device in which a liquid crystal layer may form a stable transparent state and, in addition, which provides for a black display with an excellent viewing angle characteristic, as well as a high contrast ratio and a high response speed in liquid crystal display.

In the course of their research for developing a liquid crystal display device of novel mode with improved viewing angle, response speed, and other performance characteristics, the present inventors paid attention to the fact that in the isotropic state (A) in FIG. 6 which is the phase diagram of a liquid crystal microemulsion, a liquid crystal layer becomes transparent and, therefore, by using a polarizing plate arranged in cross nicol, for instance, an ideal black display may be obtained. The inventors' attention was further directed to the fact that even in the transparent nematic phase (B), too, the liquid crystal molecules are not arranged in the same direction similarly to said isotropic state, thus macroscopically the liquid crystal layer becomes a state same as the isotropic state and, hence, the liquid crystal layer becomes transparent. It was found that in a system comprising a dispersion of fine particles in a liquid crystal layer, the liquid crystal molecules are isotropically aligned or become locally nematic state, that is to say macroscopically the liquid crystal molecules become a randomly arranged state or a state in which fine nematic phases are isotropically dispersed, with the result that an optically isotropic state, that is to say a transparent state, is obtained, and by using fine particles, the stable state can be made. The inventors found that if the liquid crystal layer constituting such a liquid crystal display device is optically isotropic when the voltage applied to the electrode is lower than a threshold value, but the arrangement of liquid crystal molecules is altered to cause an optical transition due to optical rotation when the applied voltage is not lower than the threshold value, improvements may be realized in various characteristics such as viewing angle, contrast ratio, and response speed characteristics, and the above-mentioned object may be accomplished. They also found that in such a liquid crystal display device, when the fine particles in the liquid crystal layer are provided with a surface treatment or they are as fine as 0.2 μm or less in average particle diameter, the dispersion is stabilized without undergoing phase separation for a long time, thus making it possible to sufficiently inhibit non-uniformity on the display surface due to precipitation of particles leading to a locally uneven distribution of the fine particles. Therefore, when the proper kind of fine particles is selected and the concentration of the fine particles is judiciously controlled within the range of 1 to 20% by mass, cohesion of fine particles is inhibited, among other beneficial effects, to let the device exhibit excellent fundamental performance characteristics.

They further found that even in a mode such that the fine particles in the liquid crystal layer forms partition walls, with the liquid crystalline material being surrounded by the microfine particles and, as such, present in the form of droplets within the liquid crystal layer, that is the mode comprising liquid crystal droplets, the effects of the present invention are fully exerted. The present invention has been developed on the basis of the above findings.

That is, the present invention relates to a liquid crystal display device comprising an electrode and a liquid crystal layer between substrates, wherein said liquid crystal layer consists of a liquid crystalline material containing liquid crystal molecules and fine particles, and is optically isotropic when the voltage applied to the electrode is lower than a threshold value, and undergoes optical transition due to change in the arrangement of liquid crystal molecules when the applied voltage is not lower than the threshold value.

Figure 1:
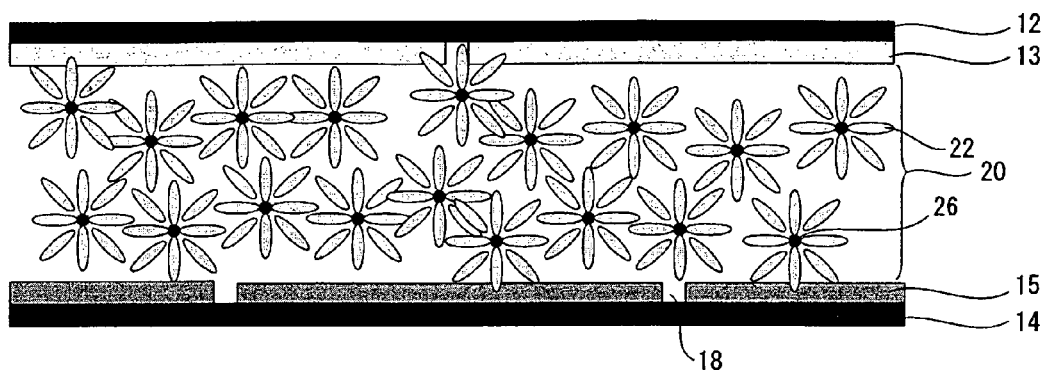
FIG. 1 is a schematic cross-sectional view showing the state of the liquid crystal layer of the liquid crystal display device as an embodiment of the invention when the voltage applied to the transparent conductive film is lower than the threshold value.

EXPLANATION OF NUMERALS AND SYMBOLS 12, 14: substrates
13, 15: transparent conductive films
18: slit
20: liquid crystal layer
22: liquid crystal molecules
26: fine particles
27: seal
28: nanosize liquid crystal droplets
29: nanosize partition wall formed by fine particles
30: liquid crystal layer comprising nanosize liquid crystal droplets
31: Codes
a: emulsion
c: state in which a nematic orientational order is locally formed

DETAILED DESCRIPTION OF THE INVENTION

The present invention is now described in detail.

The liquid crystal display device of the present invention comprises an electrode and a liquid crystal layer between substrates. As the structure of such liquid crystal display device, the formation position of the electrode, the structure between the substrates, the process for forming the liquid crystal layer and the like are not particularly restricted. Generally, the liquid crystal layer is formed by filling a liquid crystalline material into the gap between the substrates. For example, the preferred embodiment is such that electrodes are formed on the inner-facing side (internal surface) of a pair of spaced-apart substrates which are placed oppositely each other, and the liquid crystal layer is formed by filling a liquid crystalline material into a gap between the substrates or electrodes. The above structure includes the form in which the electrode is formed on the inner-facing side of either substrate of the pair and the form in which the electrode is formed only on the inner-facing side of one of the substrates. In this manner, a liquid crystal cell is formed and a liquid crystal display device is produced.

In order that the substrates and electrode of the above liquid crystal display device fully exert the functions as a liquid crystal display device, transparent substrates and electrode are preferably used. As the transparent electrode, for example, there may be mentioned a transparent electrically conductive film, and the like. Desirably the gap between the substrates is judiciously set so that the effect of the invention may be sufficiently exerted.

The liquid crystal layer mentioned above comprises a liquid crystalline material containing liquid crystal molecules and fine particles. The liquid crystal molecules and fine particles are both comprised of one or two or more species. Moreover, it is preferable to disperse the fine particles in the liquid crystalline material so that the liquid crystal layer may contain a dispersion of the fine particles. The liquid crystalline material may contain additives such as an optically active substance and a dichroic dye. That is, insofar as the effect of the present invention can be exerted, the liquid crystal layer prepared from said liquid crystalline material and fine particles may contain other components in addition to said liquid crystal molecules and fine particles.

The liquid crystal molecules mentioned above are not particularly restricted if they are capable of exhibiting liquid crystallinity, and for example, nematic liquid crystal molecules are preferred. The dielectric anisotropy ($\Delta\in$) of the liquid crystalline material constituted by such liquid crystal molecules may be positive or negative but the use of a liquid crystalline material with a negative dielectric anisotropy is preferred to the use of a liquid crystalline material with a positive dielectric anisotropy because of faster response speed and higher aperture rate. This is because in the case where a liquid crystalline material with a positive dielectric anisotropy is used, the mode of changing a liquid crystal display by utilizing the movement of liquid crystal molecules in the lateral direction (minor-axis direction) is the preferred mode but since such mode is constitutionally equivalent to the IPS mode, the response speed is not sufficient and, because of the immobility of liquid crystal molecules on the electrode, the aperture rate may also possibly be insufficient.

The dielectric anisotropy ($\Delta\in$) mentioned above can be calculated by the equation of $\Delta\in=\in_1-\in_2$, wherein $\in_1$ represents the dielectric constant in the direction of the long axis of the liquid crystal molecule and $\in_2$ represents the dielectric constant in the direction of the minor axis of the liquid crystal molecule. The dielectric constant $\in$ can be calculated by the equation of $\in=C_p d/S$ (wherein $C_p$ represents the capacitance of the liquid crystal; d represents the thickness of the liquid crystal layer; S represents the area of the overlapping part of electrodes on two substrates) as described in Okano, Mitsuharu & Kobayashi, Shunsuke (ed.): "Liquid Crystals, Fundamentals" (K. K. Baifu-Kan, Jul. 15, 1985, p. 215 to 216).

The liquid crystal layer in the present invention is optically isotropic when the voltage applied to the electrode is lower than the threshold value and undergoes optical transition due to change in the arrangement of liquid crystal molecules when the applied voltage is not lower than the threshold value. The term "optically isotropic" used herein refers to a state in which optical properties are constant regardless of the direction of measurement or, in the case of a liquid crystalline material, a condition which is evaluated is equivalent to that state.

The above liquid crystal layer may be such that it is more optically isotropic in the case where the voltage applied to the electrode is lower than the threshold value as compared with the case in which the applied voltage is not lower than said threshold value and that when the applied voltage is not lower than the threshold value, the liquid crystal molecules are arranged in a predetermined direction to cause a change in the optically isotropic state and thereby change the liquid crystal display of the liquid crystal display device. In the present invention, it is preferable to set the case in which the voltage applied to the electrode is lower than the threshold value to be the state corresponding to no application of voltage to the electrode.

It is also preferable to arrange that when the liquid crystal layer is optically isotropic, the light is not rotated but transmitted as such through the layer and when the optically isotropic state has been altered, the light is rotated and the rotated light is transmitted through the liquid crystal layer. Furthermore, it is preferable that in the optically isotropic state the light is not rotated but transmitted through the liquid crystal layer and the layer is transparent.

The threshold value mentioned above means the voltage value which generates an electric field causing an optical change of liquid crystal layer and a change in the display on the liquid crystal display device. For example, when the transmittance in bright state is set at 100%, the threshold value means the voltage value giving a transmittance of 10%. Additionally, in the present invention, the voltage value in bright state is preferably set at not higher than 10V, and more preferably not higher than 5V.

The fine particles for use in the present invention are not particularly restricted, and may be transparent or opaque. The above-mentioned fine particles are preferably those causing vertical alignment of liquid crystal molecules on the particle surface. The vertical alignment of liquid crystal molecules on the surface of the fine particles means the alignment of liquid crystal molecules in the long axis direction on the surface of the fine particles to form a nematic orientational order around the fine particles. In this state, liquid crystal molecules are aligned to surround the fine particles to form a mass. The size of the mass varies with the surface aligning force of the fine particles and also with different liquid crystalline materials.

In the present invention, the distance between the fine particles in the liquid crystal layer is preferably sufficiently shorter than the wavelength of visible light. Thus, it is preferable that the size of above-mentioned mass should not be larger than ¼ of the wavelength of visible light and that above-mentioned masses are densely filled in the liquid crystal layer. In this condition, the liquid crystal layer can exhibit a sufficiently transparent state.

Moreover, it is preferable that the above-mentioned fine particles have an average particle diameter of not more than 0.2 µm. If the average particle diameter of the particles exceeds 0.2 µm, the dispersing stability of the fine particles will not be sufficient and, moreover, the size of above-mentioned mass will not be small enough, i.e. not larger than ¼ of the wavelength of visible light, with the result that the liquid crystal layer may possibly be deficient in optical isotropy. More preferred upper limit is 0.15 µm and more preferred lower limit is 0.001 µm. The particle diameter distribution of such fine particles may have one peak or two or more peaks.

The average particle diameter mentioned above can be measured by whichever of the following two methods.

(1) The method using a particle size distribution analyzer; the particles are dispersed in a solvent and the average particle diameter is determined in the diluted solution. In this case, the measurement is preferably carried out using an analyzer which enables overall profiling by yielding diameter-classified % by mass data. A preferred typical measurement protocol comprises performing a measurement with the Super-dynamic Light Scattering Spectrophotometer DLS-7000 (product name) manufactured by Otsuka Electronics Co., Ltd., which outputs the average particle diameter automatically, and using this output as the average particle diameter of the fine particles in the present invention.

(2) The method for measurement using a scanning electron microscope (SEM); the sample is photographed with a SEM at a suitable magnification for n=100 to 500, and the average value is used as the average particle diameter.

The material of the above-mentioned fine particles is not particularly restricted and may be organic fine particles or inorganic fine particles, and, for example, organic solid particles, inorganic solid particles, or the like can be used. The organic solid particles are not particularly restricted if they are solid fine particles formed from styrenic or acrylic organic materials, etc. The inorganic solid particles are not particularly restricted, either, if they are solid fine particles formed from inorganic material.

The term "solid particles" as used above means any fine particles to the exclusion of liquid fine particles. For example, fine particles formed by micelles in an emulsion such that either one of two mutually immiscible liquid phases has been finely dispersed in the other phase are excluded.

As the preferred form of the above-mentioned fine particles, there may be mentioned (1) organic solid particles, (2) particles composed of inorganic oxide, and (3) particles composed of fullerene and/or carbon nanotubes. Among these, it is preferable to use nanosize particles.

As the above-mentioned organic solid particles, it is preferable to use, for example, fine particles in the form of polymer beads such as polystyrene beads, poly(methyl methacrylate) beads, poly(hydroxyethyl acrylate) beads, divinylbenzene beads, etc. These may have been crosslinked or uncrosslinked.

As the fine particles formed from inorganic oxide, for example, it is preferable to use fine particles formed from silicon dioxide ($SiO_2$) or fine particles formed from metal oxide. Moreover, fine particles comprising glass, silica, titania, alumina or other inorganic beads can be preferably used. These fine particles may be hydrophilic or hydrophobic.

The fullerene mentioned above may be any of those having carbon atoms in a spherical shape. For example, one having a stable structure such that the number of carbon atoms is n=24 to 96. As such fullerene, the C60 spherical closed shell carbon molecule consisting of 60 carbon atoms, among others, can be mentioned.

As the carbon nanotube mentioned above, for example, a cylindrical nanotube which is obtainable by circularizing the graphitic carbon-atom surface of a layer having a thickness of several atoms can be used.

The shape of said fine particles is not particularly restricted and includes spherical, ellipsoidal, block-shaped, columnar, and cone shapes, inclusive of these having protrusions or holes. The surface of the above-mentioned fine particles is not particularly restricted and may for example be smooth or have irregularities, pits or grooves.

It is preferable that the fine particles are provided with a surface treatment. The surface treatment provided for the fine particles can effectively stabilize a state of the liquid crystal layer. Examples of the surface treatment include a heat treatment and a provision of an organic substance. Among them, the provision of an organic substance is suitable for the surface treatment. That is, it is preferable that the surface of said fine particles is provided with an organic substance. The organic substance provided is not especially limited, but preferably exhibits liquid crystallinity. For example, compounds represented by the following structural formula (1) are preferable. Among them, a rigid liquid crystal core or mesogen each containing a cyclohexane ring, benzene ring, and the like is more preferable than a flexible connection group constituted by a single bond such as alkane.

[Formula 1]

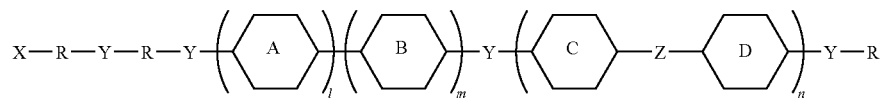

(l, m, n each representing an integer of 0 to 2.)
X; H, F, CN, $CF_2H$, $CF_3$, $C_2F_5$
R and Y being dependent to each other and each representing the following.
R; alkyl containing 1 to 10 carbon atoms, alkoxy containing 1 to 10 carbon atoms, or hydroxyalkyl containing 1 to 10 carbon atoms
Y; -, O, COO, OCO, NH, C=C, C=N, N=C, C≡C, NCON, CON, NOC
Six-membered rings A to D each representing any of the following functional groups.

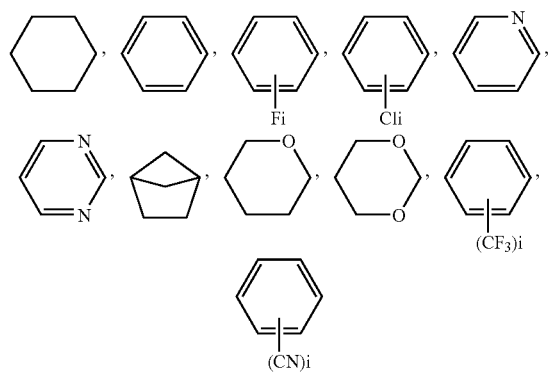

(i representing an integer of 1 to 3.)
Z; -, C—C, C=C, C=N, C≡C

The provision of an organic substance may be chemical provision (bond) or physical provision (adhesion). For example, used is a method such as grafting in which a polymer is chemically bonded to an inorganic substance surface.

And one or two or more surface treatments may be provided with the fine particles.

Hereinafter, beneficial effects obtained by the provision of the surface treatment for the fine particles will be described with reference to "Introduction to Particle/Powder Technology" (written by Tsubaki Jyunichiro, Suzuki Michitaka, Kanda Yoshiteru, issued by NIKKAN KOGYO SHIMBUN Ltd., p. 104 to 105).

Fine particles in liquid including in liquid crystal diffuse in Brownian diffuse when the particle diameter of the fine particles becomes not more than 1 μm and often have an electric charge. The charge state of the fine particles is represented by ζ (zeta) potential. Generally, if fine particles are dispersed in liquid and the fine particles having electric charges of the same code approach to each other, electrostatic repulsion and van der Waals attraction act between the fine particles. And if the fine particles further approach to each other until their electron clouds overlap, strong repulsion also acts. As mentioned above, three forces all together act on the fine particles in the liquid. The smaller the particle diameter becomes, the more dominantly van der Waals attraction acts. Therefore, the fine particles easily aggregation. With the above problem, mentioned is a method in which a surfactant is added to emulsify and disperse the fine particles. However, the surfactant is an impurity in liquid crystal, and therefore has adverse effects such as display defects during display on the liquid crystal display device. Therefore, energy making repulsion (dispersion force) high must be externally given to the fine particles in order to emulsify and disperse the fine particles in liquid crystal. That is, shearing force is needed for the emulsion and dispersion of the fine particles in liquid. This principal of emulsion and dispersion (shearing force) is classified into the one using external shearing force between fluid and contact surface by a media mill, a colloid mill, a roll mill, a pivoted method, or a high-pressure method, and the one using intermolecular force of fluid itself, that is, internal shearing force (solution-solution shearing) referred to as Reynolds stress produced by irregular variation of velocity in a turbulent flow region.

In the present invention, fine particles to be contained in liquid crystal are provided with a surface treatment, such as provision of a modified group. Therefore, the fine particles can be dispersed without external energy generated by the above-mentioned large devices.

It is preferable that the content of the above-mentioned fine particles is 1 to 20% by mass relative to the total mass of the fine particles and the liquid crystalline material. Thus, the upper limit of fine particle content is preferably 20% by mass and the lower limit thereof is preferably 1% by mass. If the particle content is less than 1% by mass, the low mixing ratio of the fine particles tends to prevent sufficient expression of the effect of them. If it exceeds 20% by mass, the excessively high formulating ratio tends to cause cohesion of particles and consequent scattering of light. More preferable upper limit is 10% by mass and more preferable lower limit is 3% by mass. The above-mentioned total mass of fine particles and liquid crystalline material means the total amount of fine particles, liquid crystal molecules, and any additives that may be formulated in the liquid crystalline material.

In the liquid crystal display device of the present invention, it is preferable that the above-mentioned liquid crystalline material has a negative dielectric anisotropy, i.e. Δε<0, and the above-mentioned liquid crystal display device is not subjected to a treatment for aligning the liquid crystal molecules.

Furthermore, it is preferable that the above-mentioned liquid crystal display device is provided with a polarizing plate arranged in cross nicol on respective sides of the liquid crystal layer to yield a black display in optically isotropic state. Since a black display can thus be produced in optically isotropic state, the black display is improved in quality (e.g. the transmittance of a black display is further reduced; the margin of thickness of the liquid crystal layer is increased; the viewing angle-dependent change decreases).

As such liquid crystal display device, for example, preferably, one which comprises transparent electrodes formed on the inner-facing side of a pair of spaced-apart transparent substrates which are placed oppositely each other and a polarizing arranged in cross nicol, is optically isotropic to become a dark state (black display) when the voltage applied to the electrode is lower than a threshold value, and undergoes optical transition due to change in the arrangement of the liquid crystal molecules when the applied voltage is not lower than the threshold value to become a bright state (white display). In this case, since the dielectric anisotropy (Δε) of the liquid crystal material becomes negative, i.e. smaller than 0, the longitudinal direction (long-axis direction) of the liquid crystal molecule moves to be vertical to the electric field generated between the transparent electrodes formed on the inner-facing sides of the paired transparent substrates when the liquid crystal molecule is moved by applying a voltage between the substrates not lower than the threshold value. Thereby, it becomes possible to increase the response speed of the liquid display due to no use of the lateral direction (minor-axis direction) of the liquid crystal molecules. Furthermore, by producing a liquid crystal display device which is not subjected to a treatment for aligning liquid crystal molecules comprised in the liquid crystal material, it becomes possible to fully exert the state in which the liquid crystal molecules are irregularly arranged or the state in which fine nematic phases are isotropically dispersed, coupled with the above-mentioned effect of the fine particles in the liquid crystal layer when the voltage applied to the electrode is lower than the threshold value.

The form in which said treatment for aligning liquid crystal molecules has not been carried out may for example be the form in which the substrates are neither provided with alignment layers nor subjected to a rubbing treatment and the like.

As one preferred embodiment of the invention, there may be mentioned the mode comprising liquid crystal droplets in the liquid crystal layer constituting a liquid crystal cell. That is, it is preferable that the liquid crystal display device comprises the fine particles and the liquid crystal droplets surrounded by the above-mentioned fine particles in the liquid crystal layer. Owing to the disposition of the fine particles in the liquid crystal layer, for example, the inside of the liquid crystal layer is divided into minute-sized parts by the partition walls consisting of the fine particles to thereby form said liquid crystal droplets. It is sufficient that at least one liquid crystal droplet is present in the liquid crystal layer, and the shape, etc. of each liquid crystal droplet is not particularly restricted. As the fine particles, any of those described above may be used. But as the fine particles to be present around the liquid crystal droplet in such manner, those formed from inorganic oxide are preferred, and nanosize particles are preferable. Thereby, nanosize partition walls are formed within the liquid crystal layer.

It is preferable that the above-mentioned liquid crystal display device has a structure comprising laminated liquid crystal droplets. By virtue of such laminated structure of the liquid crystal droplets surrounded by fine particles, the effect of the liquid crystal droplets can be sufficiently exhibited in the liquid crystal cell. That is, owing to the stable presence of the fine particles within the liquid crystal layer, the liquid crystal layer may form a stable transparent state and, in addition, effects such as excellent viewing angle and contrast ratio characteristics in the liquid crystal display can be exerted. The laminated structure of the liquid crystal droplets may be a structure such that a plurality of liquid crystal droplets is present in a vertical direction within the liquid crystal layer between the substrates constituting the liquid crystal cell.

It is preferable that the size of the above-mentioned liquid crystal droplets is not larger than 200 nm. If it is larger than 200 nm, the light may possibly scatter. The preferred range is not smaller than 50 nm but not larger than 200 nm. While it is preferable that the respective liquid crystal droplets surrounded by the fine particles should fall within the above size range, it is permissible that a majority of maximum diameters of the respective liquid crystal droplets fall within said range. The liquid crystal droplet within the above size range is referred to as "nanosize liquid crystal droplet" and the liquid crystal layer formed by the droplets is referred to as "nanosize liquid crystal droplet liquid crystal layer".

The preferred liquid crystal display device according to the present invention is now described in detail, reference being made to the accompanying drawings.

Figure 2:
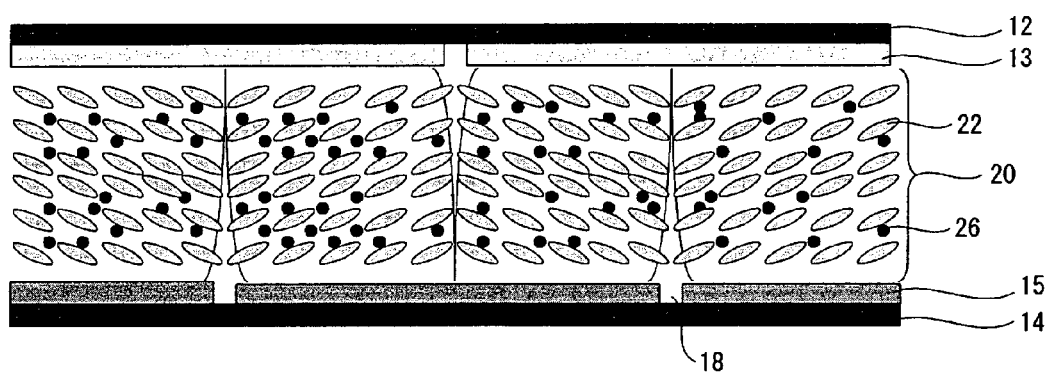
FIG. 2 is a schematic cross-sectional view showing the state of the liquid crystal layer of the liquid crystal display device as an embodiment of the invention when the voltage applied to the transparent conductive film is not lower than the threshold value. The liquid crystalline material used had a negative dielectric anisotropy, i.e. $\Delta\epsilon<0$.

FIG. 1 is a schematic cross-sectional view showing the state of the liquid crystal display device of the present invention when the voltage applied to the electrode is lower than the threshold value. FIG. 2 is a schematic cross-sectional view showing the state when the voltage applied to the electrode is not lower than the threshold value.

The liquid crystal display device shown in FIG. 1 comprises a pair of parallel substrates 12 and 14 made of glass or transparent resin, and transparent conductive layers 13 and 15 disposed on the inner-facing sides of the substrates 12 and 14. The inner sides of these transparent conductive layers 13, 15 are neither provided with an alignment layer nor have been subjected to a rubbing treatment. Interposed between these transparent conductive layers is a liquid crystal layer 20. The liquid crystal layer 20 is composed of a liquid crystalline material comprising nematic liquid crystal molecules and fine particles 26 as dispersed therein.

In the above liquid crystal display device, the liquid crystal molecules are disposed to line up in a certain settled direction when the voltage applied to the electrode is lower than a threshold value. However, because the fine particle 26 has been dispersed in the liquid crystal layer as shown in FIG. 1, the liquid crystal molecules 22 are rather controlled by the orientation of the surface of fine particle 26. Usually, the surface orientation force of fine particles has the power to align several liquid crystal molecules. Therefore, for example, the liquid crystal molecules 22 are aligned in the manner surrounding the fine particles 26, with one mass of the molecules being formed per particle. The size of this mass is dependent on the orientation force of the fine particle surface and also on the species of liquid crystalline material. But it is preferable, as described above, that the size of the mass should not be larger than ¼ of the wavelength of visible light and that the liquid crystalline material should be densely filled with such masses. Thereby, when the liquid crystal layer 20 is viewed macroscopically, it becomes a state in which the liquid crystal molecules are irregularly arranged or a state in which fine nematic phases are isotropically dispersed, thus becomes a state which is sufficiently isotropic optically.

Figure 3:
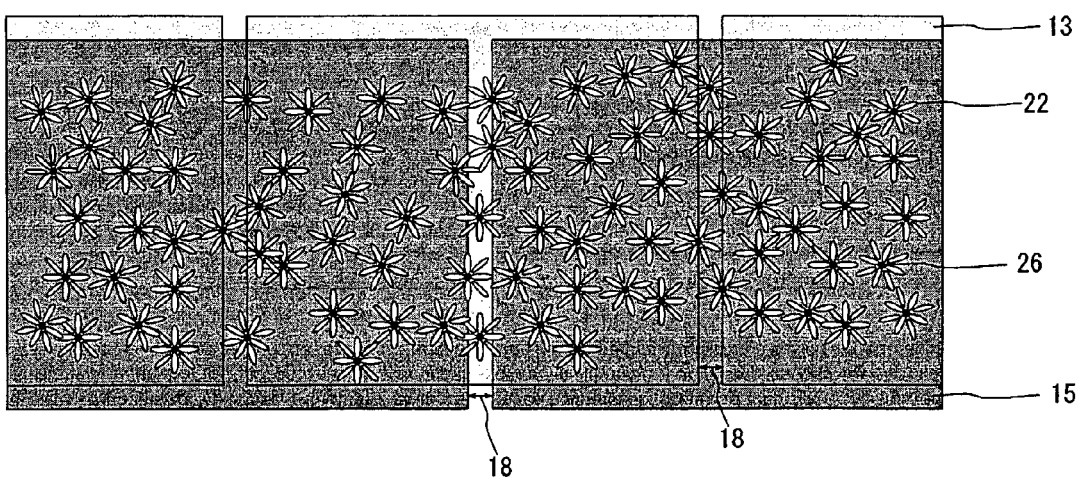
FIG. 3 is a schematic view of the liquid crystal display device of FIG. 1 as illustrated from the direction normal to the substrates.

In the case where a liquid crystalline material comprising nematic liquid crystal molecules and having a negative dielectric anisotropy, i.e. $\Delta\varepsilon < 0$, is used in the above-mentioned liquid crystal layer 20, both the upper and lower substrates are preferably provided with slits 18 in the formation of the transparent conductive layers. The cross-sectional view of the liquid crystal display device under application of a voltage lower than the threshold value to the transparent conductive layer is as shown in FIG. 1, and the view from the normal direction of the substrates under application of a voltage lower than the threshold value to the transparent conductive layer is as shown in FIG. 3. In this case, the liquid crystal molecules 22 are not aligned in the settled direction.

When polarizing plates (not shown) or the like are used in this case, the liquid crystal layer can be made transparent when the voltage applied to the transparent conductive layer is lower than the threshold value. Thus, for example, by arranging the polarizing plates in cross nicol, a dark state (black display) can be created. Since, in this liquid crystal display device, the liquid crystalline material becomes a dark state (black display) in an optically isotropic state, the black display excellent in viewing angle characteristic can be obtained in the liquid display.

On the other hand, application of a voltage not lower than the threshold value across the transparent conductive layers 13 and 15 generates an electric field in the oblique direction to the substrate surface in the electrode slit part (electrode edge part). Under the influence of this oblique electric field, the direction of tilt of the liquid crystal molecules 22 is decided so that, as shown in FIG. 2, the alignment direction of the liquid crystal molecules 22 is divided into the right and left directions. The view from the normal direction of the substrates in the case where the applied voltage is not lower than the threshold value is as shown in FIG. 4.

Figure 4:
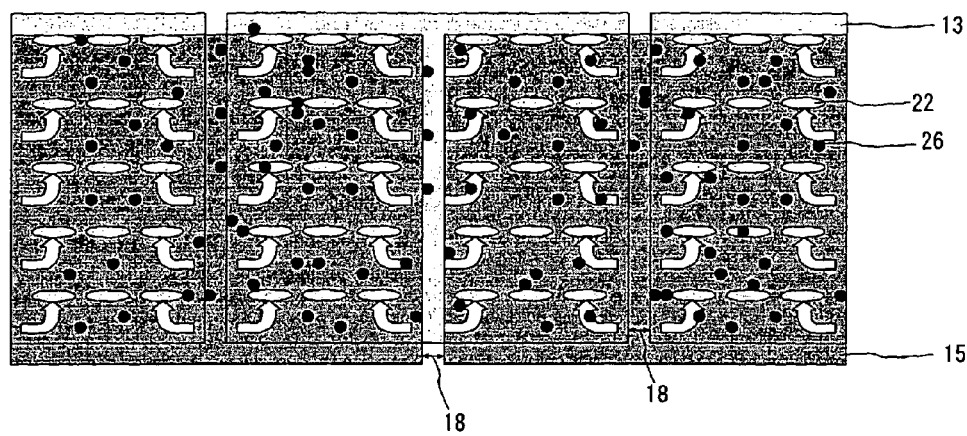
FIG. 4 is a schematic view of the liquid crystal display device of FIG. 2 as illustrated from the direction normal to the substrates.

In this case, since the liquid crystal molecules 22 which are nematic liquid crystal molecules are aligned in the same direction as shown in FIGS. 2 and 4, that is to say an electric field is generated in the direction oblique to the normal direction of the substrates, the liquid crystalline material in the liquid crystal layer 20 forms a nematic phase, with the result that a bright state (white display) can be created. The arrow marks in FIG. 4 schematically indicate the movement of liquid crystal molecules 22 in the longitudinal direction.

In the above embodiment, liquid crystal molecules are moved in the longitudinal direction by applying a voltage not lower than the threshold value across the transparent electrodes. Thus, the response speed can be made faster since lateral movement is not used and an electric field in a direction oblique to the substrate surface is generated in the slit region of the electrode to decide the direction of tilt of the liquid crystal molecules.

Figure 5:
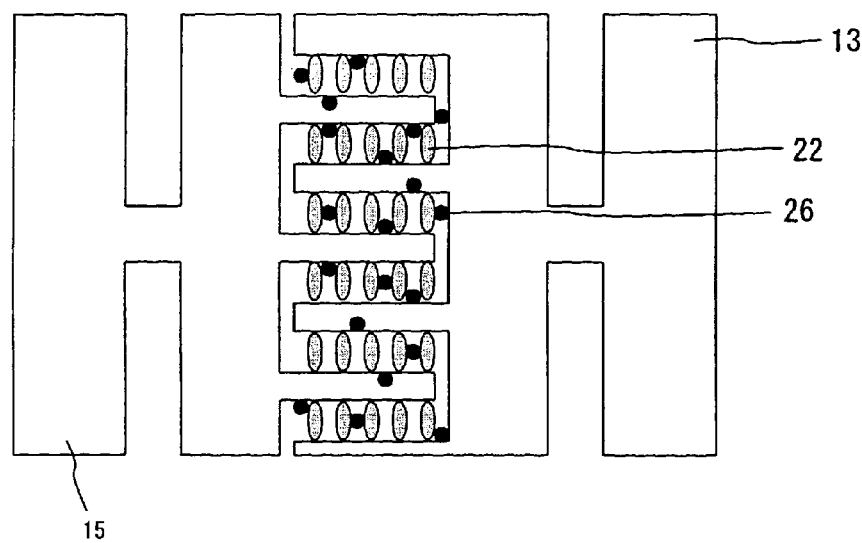
FIG. 5 is a schematic cross-sectional view showing the state of the liquid crystal layer in the liquid crystal display device as an embodiment of the invention when the voltage applied to the transparent conductive film is lower than the threshold value, as illustrated from the direction normal to the substrates. The liquid crystalline material used had a positive dielectric anisotropy, i.e. $\Delta\epsilon>0$.
Figure 6:
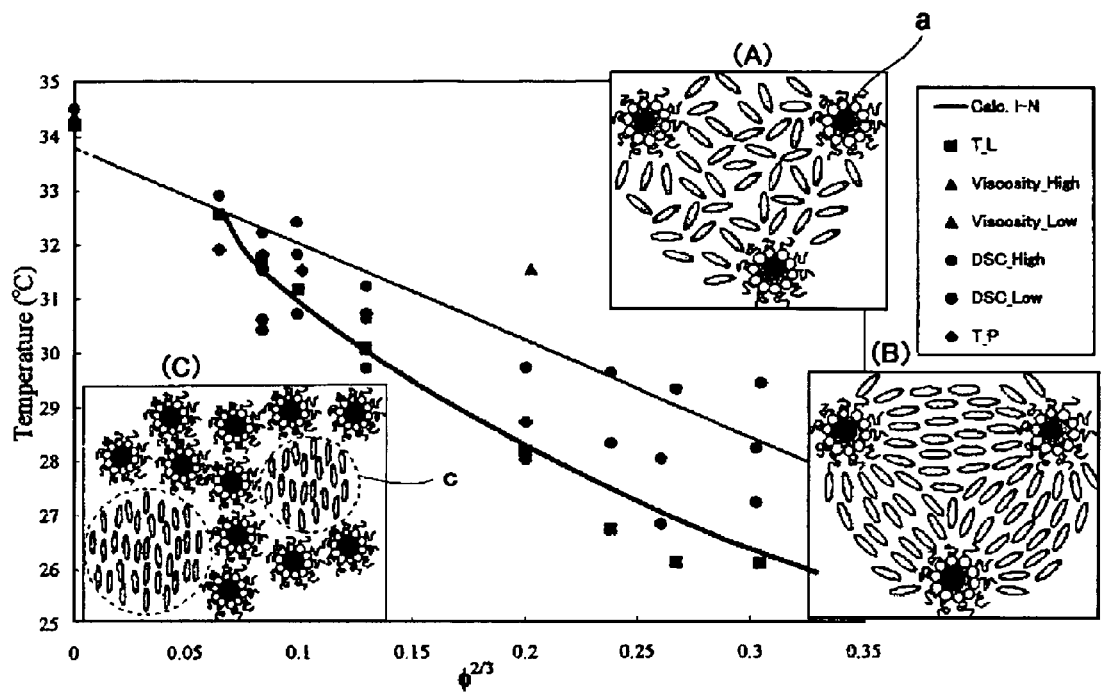
FIG. 6 is a schematic view showing the temperature/concentration-dependent phase diagram of the prior art liquid crystal microemulsion which appears in the prior art publication referred to hereinbefore. In the illustration, (A) represents an isotropic state, (B) a transparent nematic phase, and (C) a state in which nematic orientational orders are locally formed.

When a liquid crystalline material comprising nematic liquid crystal molecules and having a positive dielectric anisotropy, i.e. $\Delta \in >0$, is used in the liquid crystal layer, a liquid crystal display device can be fabricated by disposing a glass substrate patterned with a comb-shaped transparent conductive layer at one side and a glass substrate not provided with a transparent conductive layer at the other side as shown in FIG. 5. In this case, too, by utilizing polarizing plates (not shown) or the like means, the liquid crystal layer can be made transparent when the voltage applied to the electrode is lower than the threshold value. Thus, for example, by arranging the polarizing plates in cross nicol, a dark state (black display) can be created. Moreover, application of a voltage not lower than the threshold value across the transparent conductive layers 13 and 15 causes the liquid crystal molecules 22, which are nematic liquid crystal molecules, to be aligned in the same direction as shown in FIG. 5, with the result that a bright state (white display) can be created.

Figure 7:
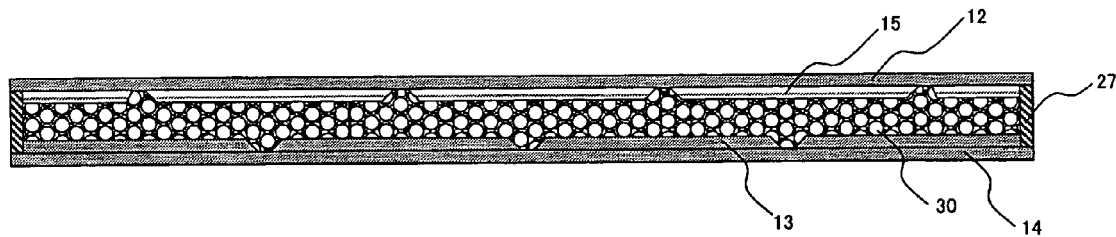
FIG. 7 is a schematic cross-sectional view showing the liquid crystal display devices according to Examples 6 and 7 of the present invention. The liquid crystalline material used had a negative dielectric anisotropy, i.e. $\Delta\epsilon<0$.
Figure 8:
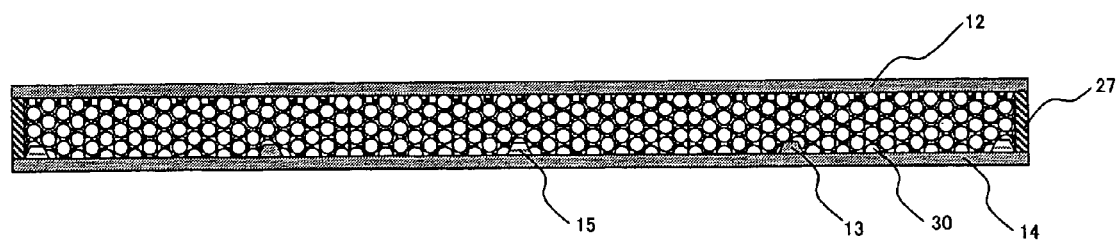
FIG. 8 is a schematic cross-sectional view of the liquid crystal display device according to Example 8 of the invention. The liquid crystalline material used had a positive dielectric anisotropy, i.e. $\Delta\epsilon>0$.
Figure 9:
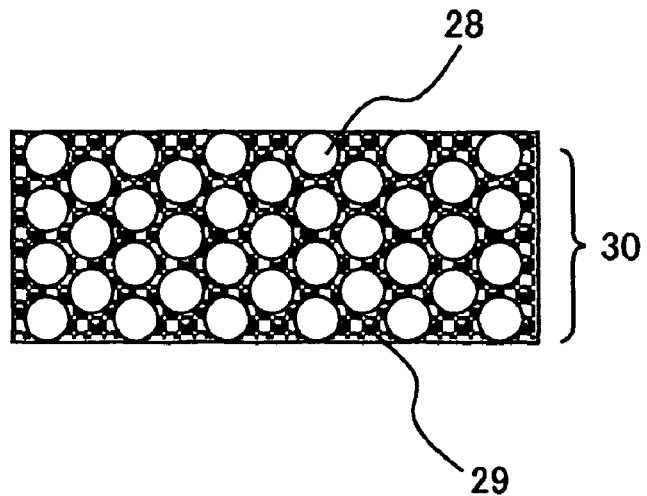
FIG. 9 is an enlarged cross-sectional view of a liquid crystal layer comprising nanosize liquid crystal droplets.
Figure 10:
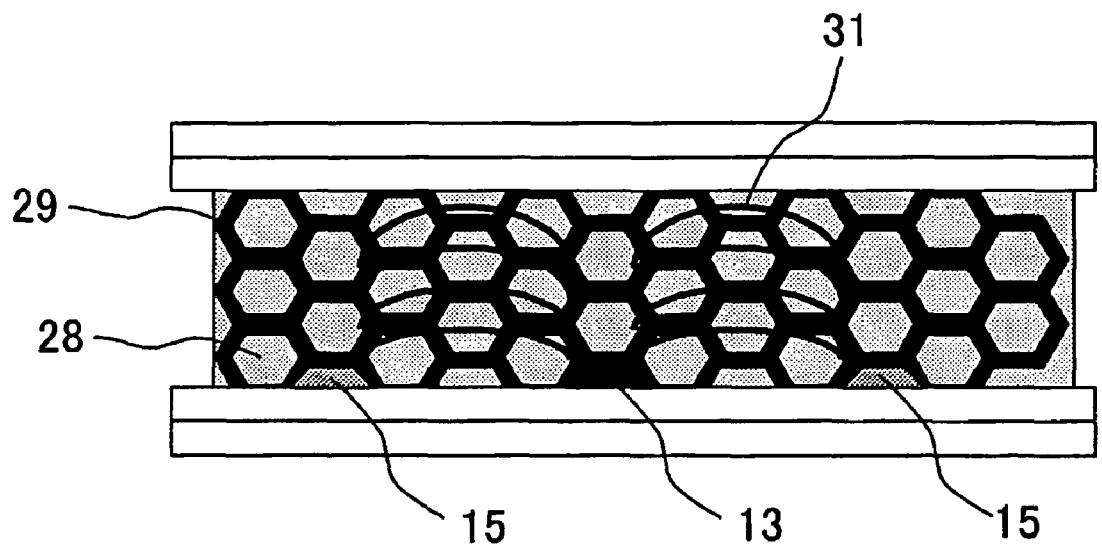
FIG. 10 is a schematic cross-sectional view showing a liquid crystal display device of the structure comprising liquid crystal droplets according to the present invention. The liquid crystalline material used had a positive dielectric anisotropy, i.e. $\Delta\in>0$.

The liquid crystal display devices in FIGS. 7 to 10 are schematic cross-sectional views showing several embodiments comprising liquid crystal droplets. FIG. 7 represents the case in which a liquid crystalline material with $\Delta \in <0$ is used; FIGS. 8 and 10 represent the case in which a liquid crystalline material with $\Delta \in >0$ is used; and FIG. 9 is an enlarged cross-sectional view showing the liquid crystal droplet liquid crystal layer for constituting the liquid crystal layers of these embodiments.

A liquid crystal cell of the above form can be fabricated by forming an inverse opal structure film on the substrate followed by conventional panel lamination and injecting (impregnating) with the liquid crystalline material.

For example, a liquid crystal cell comprising liquid crystal droplets within a liquid crystal layer can be produced by a process which comprises (1) a step of mix-dispersing nanoparticles having average particle diameters of 50 to 200 nm which can be baked off at high temperature (polystyrene, etc.) and nanoparticles having average particle diameters of not more than 5 nm which are not be baked off but constitute partition walls of fine particles within the liquid crystal layer ($SiO_2$, etc.) in an aqueous solution to prepare a mixed nanoparticle solution, (2) a step of dipping glass substrates having transparent electrodes with a slit in the above solution and forming a film having a thickness of several μm on the substrates by pull-up method with utilizing the self-assembling phenomenon of the mixed fine particles, (3) a step of baking said substrate at high temperature to bake off and gasify the above-mentioned nanoparticles having average particle diameters of 50 to 200 nm to leave holes at sites where the particles had been present, and thereby form a film of inverse opal structure on the substrate, (4) a step for laminating the substrates together, and (5) a step of injecting (impregnating) the liquid crystalline material to form liquid crystal droplets in the holes in the above film having an inverse opal structure.

In the above embodiment, nanoparticles form partition walls within the liquid crystal layer between the substrates, and nanosize liquid crystal droplets are formed in the holes surrounded by the nanoparticles. In this case, the following operational effects are exerted. That is, because the liquid crystal droplets are nanosize, no light scattering takes place in contrast with the polymer dispersed liquid crystal (PDLC) (If the nanosize exceeds 200 nm, a scattering may possibly occur). Moreover, since the size of the liquid crystal droplet is less than the wavelength order regardless of the alignment direction of liquid crystal molecules in the liquid crystal droplet, no phase difference is shown (under no voltage application, optical isotropy is established without light leakage).

Furthermore, when a liquid crystalline material comprising nematic liquid crystal molecules and having a positive dielectric anisotropy, i.e. $\Delta \in >0$, is used as shown in FIG. 10, the transparent conductive layers 13 (counter electrode) and 15 (source electrode) are formed on one of the substrates. By the voltage application, the voltage is applied as indicated by the reference numeral 31 and accordingly the liquid crystal molecules in each liquid crystal droplet are aligned in one direction.

The liquid crystal display device of the present invention is not limited to the above embodiments. For example, while the liquid crystal display devices according to the above embodiments are transmission-mode devices, these may be provided with reflector means for use as reflection-mode devices or semi-transmission mode devices permitting selective use of the two modes.

The liquid crystal display device of the present invention, constituted as above, has many advantages, namely the particle diameter of the fine particles to be dispersed in the liquid crystal layer can be made sufficiently small to insure an improved dispersion stability of the fine particles and enable formation of a stable transparent state of the liquid crystal layer, giving an ideal black display with excellent viewing angle characteristics, a high contrast ratio, and a high response speed in liquid crystal display. Therefore, the device can be applied to a variety of uses as a novel type of liquid crystal display device having excellent fundamental performance characteristics.

BEST MODE FOR CARRYING OUT THE INVENTION

The following examples are intended to illustrate the present invention in further detail without defining the scope of the invention.

EXAMPLE 1

As the liquid crystalline material, MLC-2037 (product name; manufactured by Merck Ltd.) comprising nematic liquid crystal molecules and having a negative dielectric anisotropy, i.e. $\Delta \in <0$, and as the fine particles, fullerene C60 of 99.9% by mass purity were used. The content of the fine particles (the mixing ratio of the fine particles) based on the total mass of the fine particles and liquid crystalline material was set to 5% by mass. This mixture was injected between the liquid crystal cells fabricated using glass substrates each provided with a transparent conductive layer having slits and sealed to produce a liquid crystal display device. The thickness of said liquid crystal cell was controlled to 5 μm. The liquid crystal cell was made to have the structure as shown in FIG. 1. In this fabrication process, the substrates were not subjected to aligning treatments such as deposition of an alignment layer or rubbing. When polarizing plates were arranged in cross nicol, the liquid crystal layer became isotropic under no voltage application as shown in Table 1. The light transmittance was measured and found to be 0.1%. Furthermore, when the voltage of 10V was applied between the two electrodes, the liquid crystal molecules are aligned in the same direction, the light transmittance became 30%, and a sufficient contrast ratio of 300 was obtained.

Moreover, the liquid crystal layer did not undergo phase separation even after being left for several days.

EXAMPLE 2

Except that the mixing ratio of the fine particles was changed to 15% by mass, a liquid crystal display device was fabricated in the same manner as in Example 1, and the light transmittance was measured.

As a result, a sufficient contrast ratio was obtained as shown in Table 1.

Moreover, as in Example 1, the liquid crystal layer did not undergo phase separation even after being left for several days.

Furthermore, when the mixing ratio of the fine particles was changed, it was found that similar results can be obtained within the formulation range of 1 to 20% by mass.

This device can also be provided with a reflecting means to be used as a reflection mode device or a semi-transmission mode liquid crystal display device.

EXAMPLES 3 AND 4

Except that the mixing ratio of the fine particles was changed to 0.5% by mass and 30% by mass, liquid crystal devices were fabricated in the same manner as in Examples 1 and 2, and the light transmittance of the respective devices were determined. The results are shown in Table 1.

EXAMPLE 5

Using a liquid crystalline material comprising nematic liquid crystal molecules and having a positive dielectric anisotropy, i.e. $\Delta\epsilon > 0$, a liquid crystal display device was fabricated and the light transmittance was determined. The liquid crystal cell was made to have the structure as shown in FIG. 5.

As the liquid crystalline material, MLC-6887 (product name; manufactured by Merck Ltd.) comprising nematic liquid crystal molecules was used. The other parameters of cell thickness and fine particles were the same as in Example 1.

Also in this case, aligning treatments such as deposition of an alignment layer or rubbing were not performed. When polarizing plates were arranged in cross nicol, a black display could be obtained under no voltage application. When the voltage of 10V was applied between the electrodes, a white display could be obtained as shown in FIG. 5.

The light transmittance was measured as in Example 1 and the result is shown in Table 1.

EXAMPLE 6

Except that silica powders having an average particle diameter of 200 nm was used as the fine particles, a liquid crystal display device was fabricated in the same manner as in Example 1, and the light transmittance was determined.

As a result, the contrast ratio tended to decrease as compared with Example 1, as shown in Table 1.

EXAMPLE 7

Except that silica powders having an average particle diameter of 400 nm was used as the fine particles, a liquid crystal display device was fabricated in the same manner as in Example 1, and the light transmittance was determined.

As a result, the contrast tended to decrease as compared with Example 1, as shown in Table 1. Thus, in Example 7, the particle scattering increased, and such contrast as obtained in Example 1 could not be obtained.

These results showed that the average particle diameter is preferably controlled to not more than 200 nm.

TABLE 1

| | Average particle diameter | Fine particle (% by mass) | Light transmittance (%) | | Contrast ratio (CR) | |
|---|---|---|---|---|---|---|
| | | | 0 V | 10 V | | |
| Example 1 | <50 nm | 5 | 0.1 | 30 | 300 | CR high |
| Example 2 | <50 nm | 15 | 0.1 | 30 | 300 | CR high |
| Example 3 | <50 nm | 0.5 | 25 | 30 | 1.2 | No appreciable effect of fine particles |
| Example 4 | <50 nm | 30 | 1 | 25 | 25 | Cohesion of fine particles |
| Example 5 | <50 nm | 5 | 0.1 | 25 | 250 | — |
| Example 6 | 200 nm | 5 | 0.2 | 25 | 125 | — |
| Example 7 | 400 nm | 5 | 25 | 28 | 1.1 | CR low |

(Method for Measuring the Transmittance)

Using LCD Evaluation System LCD-5000 (product name; manufactured by Otsuka Electronics Co., Ltd.), the voltage (frequency: 30 Hz or 60 Hz, waveform: rectangular wave) was applied to the cell and the transmittance was measured. As reference standards, the condition of air was set to 100% in the case of a transmission mode of display, and a standard white plate was set to 100% in the case of a reflection mode of display.

In these examples, it was found that the state in which liquid crystal molecules are irregularly arranged or the state in which fine nematic phases are isotropically dispersed is exerted when the voltage applied to the electrode is lower than the threshold value. When the devices obtained in Examples 1, 2 and 5 showing excellent fundamental performance characteristics are compared with the device obtained in Example 3 comprising the fine particle mixing ratio of less than 1% by mass, since the mixing ratio of fine particles is low in Example 3, the effect of the fine particles is not so appreciable and the nematic phase accounts for a major part of the liquid crystal layer. Thus, it was found that, in order to attain a sufficient black display with polarizing plates arranged in cross nicol under no voltage application, the lower limit of mixing ratio of fine particles is preferably set to 1% by mass. On the other hand, the device obtained in Example 4 comprising the fine particle mixing ratio of exceeding 20% by mass, the excessive content of fine particles resulted in cohesion of the fine particles to cause light scattering under voltage application. Thus, in order to obtain a sufficient contrast ratio, it was found that the upper limit of mixing ratio of the fine particles is preferably set to 20% by mass.

In Examples 1, 2 and 5, it was found that since the mixing ratio of fine particles was set within the preferred range, a sufficient black display was obtained with polarizing plates arranged in cross nicol under no voltage application, and a sufficient white display was obtained when the voltage applied to the electrode was not lower than the threshold value, thus liquid crystal display devices excellent in contrast ratio and other fundamental performance characteristics could be obtained.

In addition, in Example 5, where the liquid crystalline material having a positive dielectric anisotropy, i.e. $\Delta\varepsilon{>}0$, was used, the light transmittance under voltage application of not lower than the threshold value is decreased as compared with Examples 1 and 2 owing to the inability to control the liquid crystal molecules on the electrode. Thus, it was found rather preferable that a liquid crystalline material of $\Delta\varepsilon{<}0$ is used for the fabrication of liquid crystal display devices.

EXAMPLE 8

For the fabrication of a liquid crystal cell having nanosize liquid crystal droplets, firstly, porous (inverse opal) layers having nanosize holes were formed on the substrates. That is, in an aqueous solution in which fine polystyrene powders having a particle diameter of 200 nm and fine $SiO_2$ powders having a particle diameter of 5 nm were mixed and dispersed, glass substrates provided with a transparent electrode having slits were dipped and then a layer having a thickness of several μm was produced by pull-up method with utilizing the self-assembling phenomenon of the mixed fine particles. Then, by baking at a high temperature to gasify the polystyrene, a substrate with inverse opal structure having 200 nm holes was obtained.

The substrates were laminated to form a cell, and a liquid crystalline material was injected into the holes to fabricate a liquid crystal cell having nanosize liquid crystal droplets with the structure shown in FIG. 7.

As the liquid crystalline material, MLC-2037 (product name, manufactured by Merck Ltd.) comprising nematic liquid crystal molecules and having a negative dielectric anisotropy, i.e. $\Delta\varepsilon{<}0$, was used.

In the course of fabrication, no aligning treatment, such as deposition of an alignment layer or rubbing, was carried out.

When polarizing plates were arranged in cross nicol, the liquid crystal layer became optically isotropic under no voltage application as shown in Table 2. The light transmittance was measured and found to be 0.1%. Furthermore, when the voltage of 10V was applied between the electrodes, the liquid crystal molecules were aligned in the same direction, the light transmittance became 30%, and a sufficient contrast ratio of 300 was obtained.

EXAMPLE 9

Except that the particle diameters of polystyrene were changed to 50 nm and 100 nm, liquid crystal display devices having nanosize liquid crystal droplets filled with liquid crystal in 50 nm and 100 nm nanoholes were produced in the same manner as in Example 8, and the light transmittance of each device was determined.

As a result, sufficient contrast ratios were obtained as shown in Table 2.

Moreover, it was found that the transmittance under voltage application becomes higher as the hole size becomes larger.

Conversely, it was found that the transmittance under voltage application becomes lower and the contrast becomes higher as the hole size becomes smaller.

This liquid crystal display device can also be provided with a reflecting means to be used as a reflection mode or semi-transmission mode liquid crystal display device.

EXAMPLE 10

Except that the particle diameter of polystyrene was changed to 400 nm, a liquid crystal display device comprising nanosize liquid crystal droplets filled with liquid crystal in 400 nm nanoholes was produced in the same manner as in Example 7, and the light transmittance was determined.

As a result, as shown in Table 2, sufficient contrast ratios were obtained for those having nanosize liquid crystal droplets of 50 nm (Example 9), 100 nm (Example 9)and 200 nm(Example 8), but a sufficient contrast ratio was not obtained for that having nanosize liquid crystal droplets of 400 nm.

EXAMPLE 11

Referring to the liquid crystal cell comprising nanosize liquid crystal droplets, a liquid crystal display device was fabricated by using a liquid crystalline material comprising nematic liquid crystal molecules and having a positive dielectric anisotropy, i.e. $\Delta\varepsilon{>}0$, and the light transmittance was determined. The liquid crystal cell was made to have the structure shown in FIG. 8.

As the liquid crystalline material, MLC-6887 (product name, manufactured by Merck Ltd.) comprising nematic liquid crystal molecules was used.

The other parameters of cell thickness and fine particles were the same as in Examples 8 and 9.

Also in this case, aligning treatments such as deposition of an alignment layer or rubbing were not carried out. When polarizing plates were arranged in cross nicol, the liquid crystal layer became optically isotropic under no voltage application and a black display could be obtained, while a white display could be obtained under voltage application between the electrodes.

The light transmittance was determined as in Examples 8 and 9. The results are shown in Table 2.

TABLE 2

|  | Liquid crystal nanosize (nm) | Light transmittance (%) | | Contrast ratio (CR) |
| --- | --- | --- | --- | --- |
|  |  | 0 V | 10 V |  |
| Example 8 | 200 | 0.10 | 30 | 300 |
| Example 9 | 100 | 0.05 | 25 | 500 |
|  | 50 | 0.01 | 20 | 2000 |
| Example 10 | 400 | 24 | 26 | 1.1 |
| Example 11 | 50 | 0.01 | 20 | 2000 |

EXAMPLE 12

As the liquid crystalline material, MLC-2037 (product name; manufactured by Merck Ltd.) comprising nematic liquid crystal molecules and having a negative dielectric anisotropy, i.e. Δ∈<0, and as the fine particles, silica powders having a particle diameter of 20 nm, with which an alkyl group ($C_5H_{11}$; in the above formula (1), l, m, n each represent 0, X represents hydrogen, Y represents—(single bond)) were provided, were used. The content of the fine particles (the mixing ratio of the fine particles) based on the total mass of the fine particles and liquid crystalline material was set to 5% by mass. Conventionally, a large dispersing device, in which a large amount of fine particles are dispersed with a high pressure device, is needed in order to disperse fine particles sufficiently. However, in this Example, use of a small homogenizer enables fine particles to disperse sufficiently into liquid crystal, and no phase separation was observed after being left for several days. This mixture was injected between the liquid crystal cells fabricated using glass substrates each provided with a transparent conductive layer having slits and sealed to produce a liquid crystal display device. The thickness of the liquid crystal cell was controlled to 5 μm. The liquid crystal cell was made to have the structure as shown in FIG. 1. In this fabrication process, the substrates were not subjected to aligning treatments such as deposition of an alignment layer or rubbing. When polarizing plates were arranged in cross nicol, the liquid crystal layer became isotropic under no voltage application as shown in Table 3. The light transmittance was measured and found to be 0.1%. Furthermore, when the voltage of 10V was applied between the two electrodes, the liquid crystal molecules are aligned in the same direction, the light transmittance became 30%, and a sufficient contrast ratio of 300 was obtained.

EXAMPLE 13

Except that silica powders having an average particle diameter of 200 nm, with which a compound represented by the following formula (2) was provided, were used as the fine particles, a liquid crystal display device was fabricated in the same manner as in Example 1, and the light transmittance was measured.

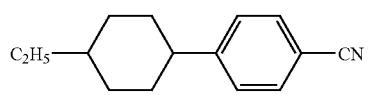

[Formula 2]

As a result, a sufficient contrast ratio was obtained as shown in Table 3.

Also in this Example, the small homogenizer was used to disperse the fine particles just like the fine particles provided with the alkyl group in Example 12. Moreover, the liquid crystal layer did not undergo phase separation even after being left for several ten days, because the fine particles in this Example were superior to the fine particles provided with the alkyl group in dispersibility.

Furthermore, when the mixing ratio of the fine particles was changed, it was found that similar results can be obtained within the formulation range of 1 to 20% by mass.

EXAMPLE 14

Except that the mixing ratio of the fine particles was changed to 15% by mass, a liquid crystal display device was fabricated in the same manner as in Example 12, and the light transmittance was measured.

As a result, a sufficient contrast ratio was obtained as shown in Table 3.

Moreover, as in Example 12, the liquid crystal layer did not undergo phase separation even after being left for several days.

Furthermore, when the mixing ratio of the fine particles was changed, it was found that similar results can be obtained within the formulation range of 1 to 20% by mass.

This device can also be provided with a reflecting means to be used as a reflective or a transflective liquid crystal display device.

EXAMPLES 15 AND 16

Except that the mixing ratio of the fine particles was changed to 0.5% by mass and 30% by mass, liquid crystal devices were fabricated in the same manner as in Example 12, and the light transmittance of the respective devices were determined. The results are shown in Table 3.

EXAMPLE 17

Using a liquid crystalline material comprising nematic liquid crystal molecules and having a positive dielectric anisotropy, i.e. Δ∈>0, a liquid crystal display device was fabricated and the light transmittance was determined. The liquid crystal cell was made to have the structure as shown in FIG. 5.

As the liquid crystalline material, MLC-6887 (product name; manufactured by Merck Ltd.) comprising nematic liquid crystal molecules was used. The other parameters of cell thickness and fine particles were the same as in Example 12.

Also in this case, aligning treatments such as deposition of an alignment layer or rubbing were not performed. When polarizing plates were arranged in cross nicol, a black display could be obtained under no voltage application. When the voltage of 10 V was applied between the electrodes, a white display could be obtained as shown in FIG. 5.

The light transmittance was measured as in Example 12 and the result is shown in Table 3.

EXAMPLE 18

Except that silica powders having an average particle diameter of 200 nm was used as the fine particles, a liquid crystal display device was fabricated in the same manner as in Example 12, and the light transmittance was determined.

As a result, the contrast ratio tended to decrease as compared with Example 12, as shown in Table 3.

EXAMPLE 19

Except that silica powders having an average particle diameter of 400 nm was used as the fine particles, a liquid crystal display device was fabricated in the same manner as in Example 12, and the light transmittance was determined.

As a result, the contrast tended to decrease as compared with Example 12, as shown in Table 3. Thus, in this Example, the particle scattering increased, and such contrast as obtained in Example 12 could not be obtained.

These results showed that the average particle diameter is preferably controlled to not more than 200 nm.

(Method for Measuring the Transmittance)

Using LCD Evaluation System LCD-5000 (product name; manufactured by Otsuka Electronics Co., Ltd.), the voltage (frequency: 30 Hz or 60 Hz, waveform: rectangular wave) was applied to the cell and the transmittance was measured. As reference standards, the condition of air was set to 100% in the case of a transmission mode of display, and a standard white plate was set to 100% in the case of a reflection mode of display.

TABLE 3

|  | Average particle diameter | Fine particle (% by mass) | Light transmittance (%) 0 V | Light transmittance (%) 10 V | Contrast ratio (CR) | |
|---|---|---|---|---|---|---|
| Example 12, 13 | 20 nm | 5 | 0.1 | 30 | 300 | CR high |
| Example 14 | 20 nm | 15 | 0.1 | 30 | 300 | CR high |
| Example 15 | 20 nm | 0.5 | 25 | 30 | 1.2 | No appreciable effect of fine particles |
| Example 16 | 20 nm | 30 | 1 | 25 | 25 | Cohesion of fine particles |
| Example 17 | 20 nm | 5 | 0.1 | 25 | 250 | — |
| Example 18 | 200 nm | 5 | 0.2 | 25 | 125 | — |
| Example 19 | 400 nm | 5 | 25 | 28 | 1.1 | CR low |

In these examples, it was found that the state in which liquid crystal molecules are irregularly arranged or the state in which fine nematic phases are isotropically dispersed is exerted when the voltage applied to the electrode is lower than the threshold value. When the devices obtained in Examples 12 to 14 and 17 showing excellent fundamental performance characteristics are compared with the device obtained in Example 15 comprising the fine particle mixing ratio of less than 1% by mass, since the mixing ratio of fine particles is low in Example 15, the effect of the fine particles is not so appreciable and the nematic phase accounts for a major part of the liquid crystal layer. Thus, it was found that, in order to attain a sufficient black display with polarizing plates arranged in cross nicol under no voltage application, the lower limit of mixing ratio of fine particles is preferably set to 1% by mass. On the other hand, the device obtained in Example 16 comprising the fine particle mixing ratio of exceeding 20% by mass, the excessive content of fine particles resulted in cohesion of the fine particles to cause light scattering under voltage application. Thus, in order to obtain a sufficient contrast ratio, it was found that the upper limit of mixing ratio of the fine particles is preferably set to 20% by mass.

In Examples 12 to 14 and 17, it was found that since the mixing ratio of fine particles was set within the preferred range, a sufficient black display was obtained with polarizing plates arranged in cross nicol under no voltage application, and a sufficient white display was obtained when the voltage applied to the electrode was not lower than the threshold value, thus liquid crystal display devices excellent in contrast ratio and other fundamental performance characteristics could be obtained.

In addition, in Example 17, where the liquid crystalline material having a positive dielectric anisotropy, i.e. $\Delta\epsilon>0$, was used, the light transmittance under voltage application of not lower than the threshold value is decreased as compared with Examples 12 owing to the inability to control the liquid crystal molecules on the electrode. Thus, it was found rather preferable that a liquid crystalline material of $\Delta\epsilon<0$ is used for the fabrication of liquid crystal display devices.

The invention claimed is:

1. A liquid crystal display device comprising
an electrode and a liquid crystal layer between substrates,
wherein said liquid crystal layer comprises a liquid crystalline material containing liquid crystal molecules and fine particles, and is substantially optically isotropic when voltage applied to the electrode is lower than a threshold value and undergoes optical transition due to change in arrangement of the liquid crystal molecules when the applied voltage is not lower than the threshold value, and
wherein distance between the majority of the fine particles in the liquid crystal layer is shorter than a wavelength of visible light.

2. The liquid crystal display device according to claim 1, wherein said fine particles are those causing vertical alignment of the liquid crystal molecules on the particle surface.

3. The liquid crystal display device according to claim 1, wherein said fine particles have an average particle diameter of not more than 0.2 µm.

4. The liquid crystal display device according to claim 1, wherein said fine particles are organic solid particles.

5. The liquid crystal display device according to claim 1, wherein said fine particles are composed of inorganic oxide.

6. The liquid crystal display device according to claim 1, wherein said fine particles are composed of fullerene and/or carbon nanotube.

7. The liquid crystal display device according to claim 1, wherein said fine particles are provided with a surface treatment.

8. The liquid crystal display device according to claim 7, wherein the surface of said fine particles is provided with an organic substance.

9. The liquid crystal display device according to claim 8, wherein said organic substance exhibits liquid crystallinity.

10. The liquid crystal display device according to claim 1, wherein the content of said fine particles is 1 to 20% by mass relative to the total mass of the fine particles and the liquid crystalline material.

11. The liquid crystal display device according to claim 1, wherein said liquid crystalline material has a negative dielectric anisotropy, i.e. $\Delta\epsilon<0$, and said liquid crystal display device is not subjected to a treatment for aligning the liquid crystal molecules.

12. The liquid crystal display device according to claim 1, wherein said liquid crystal display device is provided with a polarizing plate arranged in cross nicol on respective sides of the liquid crystal layer to yield a black display in optically isotropic state.

13. The liquid crystal display device according to claim 1, wherein said liquid crystal display device comprises fine particles and liquid crystal droplets surrounded by said fine particles within the liquid crystal layer.

14. The liquid crystal display device according to claim 13, wherein said liquid crystal display device has a structure comprising laminated liquid crystal droplets.

15. The liquid crystal display device according to claim 13, wherein the size of said liquid crystal droplets is not larger than 200 nm.

16. A liquid crystal display device comprising:

an electrode and a liquid crystal layer between substrates wherein said liquid crystal layer comprises liquid crystalline material including liquid crystal molecules and fine particles, and is substantially optically isotropic when voltage applied to the electrode is lower than a threshold value and undergoes optical transition due to change in arrangement of the liquid crystal molecules when the applied voltage is not lower than the threshold value, wherein distance between the majority of the fine particles in the liquid crystal layer is shorter than a wavelength of visible light, and wherein the particles are at centers of respective clusters of liquid crystal molecules oriented therearound.

17. The liquid crystal display device according to claim 16, wherein said fine particles are those causing vertical alignment of the liquid crystal molecules on the particle surface.

18. The liquid crystal display device according to claim 16, wherein said fine particles have an average particle diameter of not more than 0.2 μm.

19. The liquid crystal display device according to claim 16, wherein said fine particles are composed of inorganic oxide.

20. The liquid crystal display device according to claim 16, wherein the content of said fine particles is 1 to 20% by mass relative to the total mass of the fine particles and the liquid crystalline material.

* * * * *